(12) United States Patent
Kim et al.

(10) Patent No.: US 10,719,367 B1
(45) Date of Patent: Jul. 21, 2020

(54) MANAGEMENT OF WORKERS EXECUTING PROGRAM CODE FUNCTIONS

(71) Applicant: Amazon Technologies, Inc., Seattle, WA (US)

(72) Inventors: Daniel Kim, Bellevue, WA (US); Cheng Pan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 16/020,878

(22) Filed: Jun. 27, 2018

(51) Int. Cl.
*G06F 9/50* (2006.01)
*G06F 9/48* (2006.01)
*G06F 9/455* (2018.01)
*H04L 29/08* (2006.01)

(52) U.S. Cl.
CPC ........ *G06F 9/5055* (2013.01); *G06F 9/45504* (2013.01); *G06F 9/45558* (2013.01); *G06F 9/4881* (2013.01); *G06F 9/50* (2013.01); *G06F 9/5005* (2013.01); *G06F 9/505* (2013.01); *H04L 67/32* (2013.01); *G06F 2009/45562* (2013.01); *G06F 2009/45591* (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 2012/0060172 A1* | 3/2012 | Abouzour | G06F 9/5027 718/105 |
| 2014/0173131 A1* | 6/2014 | Newton | H04L 41/0893 709/240 |
| 2019/0163528 A1* | 5/2019 | Zhou | H04L 47/823 |

* cited by examiner

*Primary Examiner* — Qing Yuan Wu
(74) *Attorney, Agent, or Firm* — Thorpe North & Western, LLP

(57) ABSTRACT

A technology is described for executing work requests. In one example, a worker configured to execute an instance of a program code function of a defined function type that corresponds to an expected work request to execute the program code function may be initialized in computer memory, and the worker may be added to a worker pool. A worker reservation policy may determine how many workers may be held in the worker pool based in part on an anticipated demand for the workers. A work request to execute the program code function may be received, and in response, a work item may be generated for execution by the worker. The worker may be identified in the worker pool, and the worker and the work item may be assigned to a work item manager to enable the work item manager to invoke the worker to execute the work item.

20 Claims, 10 Drawing Sheets

MANAGEMENT OF WORKERS EXECUTING PROGRAM CODE FUNCTIONS

BACKGROUND

Electronic devices and computing systems have become ever-present in many aspects of society. Devices may be found in the workplace, at home, or at school. Computing systems may include computing and data storage systems to process and store data. Some computing systems offer centralized, virtual computing options known as service provider environments (e.g., "cloud" environment) that may reduce overall costs, improve availability, improve scalability, and reduce time to deploy applications. Other computing systems may include computing hubs that offer localized computing for processing data, which may reduce latency associated with sending data over a network for processing.

Advancements in communication technologies have allowed for even relatively simple electronic devices to communicate with computing systems. For example, the Internet of Things (IoT) is the interconnection of computing devices across the world using Internet infrastructure. Such devices may be able to capture data, and securely communicate the data over a network to a computing system. In one example, the devices may send the data to a computing hub or computing node in a local device network, and the computing hub may process the data using services hosted on the computing hub.

DETAILED DESCRIPTION

Figure 1:
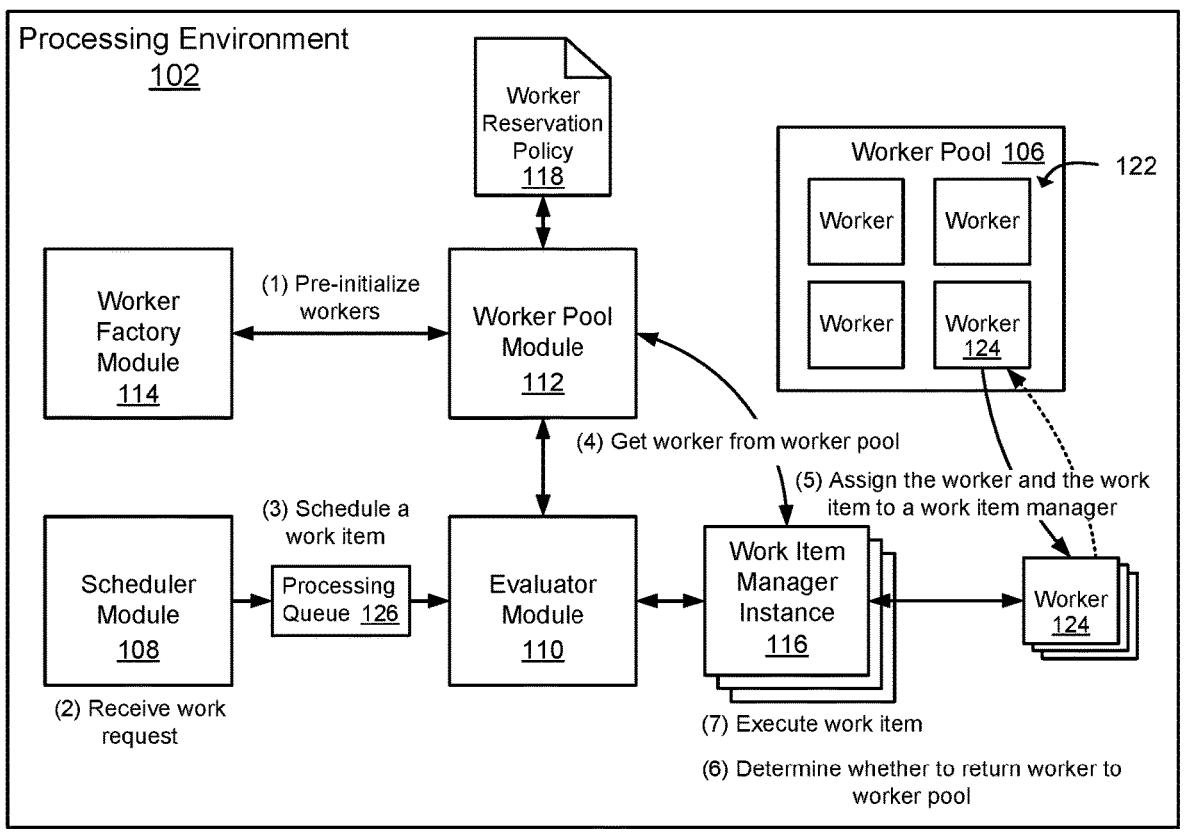
FIG. 1 is a diagram that illustrates an example of a processing environment used to process a work item in response to receiving a work request.

Technologies are described for initializing workers or worker processes configured to execute program code functions requested by devices, and making the workers available, via a worker pool, to execute work items in response to receiving work requests from the devices to execute the program code functions. For example, devices may be configured to send work requests to a computing hub requesting the execution of program code functions having function types. A function type may be a particular program code function that performs a defined action when executed. The program code functions which the devices are configured to request may be hosted on the computing hub, and workers initialized to execute the program code functions may execute the program code functions when the matching requests are received from the devices.

In one example, a program code function, which devices are configured to request, may be deployed to a computing hub and a worker configured to execute the program code function may be initialized and held in a worker pool on the computing hub so that the worker may be ready to execute the program code function when a work request to execute the program code function is received from a device. Work requests may include parameters used to execute program code functions. Work items may be processed using a processing environment on the computing hub that includes services for scheduling and evaluating the work items using the workers obtained from the worker pool. A worker may include a containerized instance of a defined program code function which is to be executed. In one example, a program code function may be a "serverless" function or computer code that may be invoked in response to a work request. The program code function may be implemented using a software container that provides an isolated environment for the program code function to execute.

Initialized workers may be added to the worker pool in anticipation of receiving work requests from devices configured to make the work requests, making the workers contained in the worker pool available to execute the work requests when the work requests are received. By initializing the workers in advance of receiving the work requests from the devices, and making the workers available via the worker pool, work request throughput may be increased by avoiding an amount of time needed to initialize a worker at the time a work request is received.

A worker reservation policy may determine how many workers may be held in the worker pool. For example, the worker reservation policy may define a reservation count for a number of workers that may be held in the worker pool. In one example, workers contained in the worker pool may comprise different function types that execute program code functions requested by devices, such as a set of workers having a defined function type that execute a first program code function (e.g., process data) requested by a device, and a set of workers having a different function type that execute a second program code function (e.g., send a message) requested by a device. The worker reservation policy may include a reservation count for each defined function type that may be requested by a device and may be held in the worker pool. In one example, a reservation count may be specified by a user (e.g., a systems administrator). In another example, a reservation count may be dynamic and may be determined based on anticipated demand for a worker. Anticipated demand may be estimated using, for example, heuristics, work request metrics, machine learning, and other prediction techniques.

In response to receiving a work request from a device to execute a program code function, the worker pool may be queried to determine whether the worker pool includes a worker that has a function type that executes the program code function specified by the work request. In the case that the worker pool does include a worker having the function type, the work request may be assigned to the worker and the worker may be invoked to process the work request. After processing the work request, a determination whether to return the worker to the worker pool may be made. For example, after processing the work request, the worker may be returned to the worker pool when a reservation count for the function type is not fulfilled (e.g., a number of workers for a function type held in the worker pool does not meet the reservation count). Otherwise, the worker may be discarded when the reservation count for the function type is fulfilled.

To further describe the present technology, examples are now provided with reference to the figures. FIG. 1 is a diagram that illustrates an example of a processing environment 102 that may be used to process work items in response to receiving work requests to execute program code functions. In one example of the technology, the processing environment 102 may include a worker pool module 112 configured to manage a worker pool 106 containing workers 122 that execute program code functions in response to receiving work requests. A worker 122 (or a worker process) may be a containerized instance of a program code function, and the worker pool 106 may be a data structure (e.g., data store records) containing worker identifiers or handles for a plurality of workers 122 currently residing in memory (e.g., suspended in memory), which may be configured to execute defined program code functions. As an illustration, the worker pool 106 may contain workers 122 configured to execute program code functions, such as, but not limited to, a program code function that processes data received from clients, a program code function that sends messages to clients, a program code function that updates a represented device state, as well as other defined program code functions.

The worker pool module 112 may be configured to cause a number of workers 122 to be initialized and cause the workers 122 to be added to the worker pool 106 in anticipation of receiving work requests to execute program code functions. For instance, a worker 122 configured to execute a program code function that is expected or predicted to be requested by a device may be initialized and held in the worker pool 106 so that the worker 122 may be ready to execute the program code function when a work request to execute the program code function is received from the device (or from a service located in a service provider environment). This prediction may occur because of the types of devices that are connected to a processing environment 102 that request execution of specific program code functions. That is, the program code functions that may be executed by workers 122 are limited to the types of program code functions that may be requested by the devices, and the frequency of the requests received from the devices. The prediction may be generated using a heuristic or a machine learning model used to determine how frequently the program code functions will be requested.

In one example, program code functions requested by devices may be deployed to a function host (e.g., computing hub, server, computing instance, etc.), which hosts the processing environment 102, and the function host may receive work requests for the program code functions from devices. Deploying a program code function to a function host may include sending a function deployment package to the function host and unpacking the function deployment package (e.g., decompressing, installing, inspecting, etc.) to identify a function type of the program code function and registering the function type with a worker factory module 114 configured to create workers 122 that execute the program code function. As a specific example, a function deployment package containing a program code function that when executed, analyzes data received from the devices, may be deployed to a computing hub that hosts the processing environment 102. The function deployment package may include function metadata, including a function type identifier (e.g., "MyFunction_AnalyzeDeviceData"), which may be registered with the worker factory module 114. The worker factory module 114 may use the function type identifier (e.g., "MyFunction_AnalyzeDeviceData") to identify the program code function (e.g., a function type identifier) and also initialize workers 122 configured to execute the program code function. The workers 122 may be added to the worker pool 106, in anticipation of receiving work requests from the devices to execute the program code function. A worker 122 created to execute the program code function may be assigned the function type identifier (e.g., "MyFunction_AnalyzeDeviceData"), and the function type identifier (e.g., "MyFunction_AnalyzeDeviceData") may be used to match a work request received from a device to the worker 122. For example, the work request received from the device may request that the function type "MyFunction_AnalyzeDeviceData" be executed, and a worker 122 configured to execute the function type "MyFunction_AnalyzeDeviceData" may be identified and the worker 122 may be invoked to execute the program code function that analyzes data received from the device.

While a worker 122 configured to execute a program code function has been described above as being selected by selecting a worker 122 that matches the work request or expected work request, the correspondence between the two items may be identified using similarities or indirect correspondence. For example, selecting a worker 122 in response to a work request may be performed using similarities (and not exact matches) between the work request and other program code function attributes, host attributes or requesting device attributes. For example, a worker 122 configured to execute a program code function may be selected using similarities in a defined function type or a code function name (e.g., "MyFunction_AnalyzeDeviceData" may be similar to "MyFunction_AnalyzeDeviceData 2018". Similarly, a worker 122 configured to execute a program code function may be selected by identifying similarities (or signature hits) in program code function input and/or output parameters (e.g., similar to function overloading).

In another configuration, a program code function may contain an attribute, tag, or state that identifies host hardware upon which the program code function may more efficiently execute. For example, a work request may come in and the host hardware of the current function host may be identified. Then the combination of the work request and the host hardware may be used to select a worker 122 configured to execute a more optimized program code function that corresponds to the host hardware, and worker 122 may be retrieved from the worker pool 106 and executed. Similarly, a worker 122 configured to execute a program code function may be selected using similarities in software container types, execution libraries, or SDKs (software development kits) for executing the program code function, or interface libraries (e.g., API function calls) that enable specific types of remote and service provider resources to be accessed. In yet another configuration, a requesting device type for a device connected to a function host may be used to select a worker 122 configured to execute a program code function which will provide responses or results back to the requesting device in a data format or other device specific configuration desired by the requesting device.

In one example, the worker pool 106 may include workers 122 of various function types. For example, the worker pool 106 may include a set of workers 122 of a first type configured to execute a first program code function (e.g., process data received from a device), and a set of workers 122 of a second type configured to execute a second program code function (e.g., update a state of a device representation). By initializing the workers 122 and adding the workers 122 to the worker pool 106, the workers 122 may be ready to execute the program code functions when the work requests are received.

A number of workers 122 held in the worker pool 106 may be managed using a worker reservation policy 118. The worker reservation policy 118 may specify how many workers 122 of different function types may be held in the worker pool 106 at any given time, where the number of workers 122 specified by the worker reservation policy 118 may be based in part on an estimated number of requests for the workers 122 expected to be received from clients. In one example, the worker reservation policy 118 may define a reservation count for each class of workers 122 that may be held in the worker pool 106. The reservation count may be a numerical value that indicates how many workers 122 having a function type may be held in the worker pool 106. As will be appreciated, a reservation count may be any value greater than zero. In one example, a reservation count may be provided by a user and the user may update the reservation count periodically based on an anticipated demand for workers 122. In another example, a reservation count may be dynamically modified based in part on heuristics, work request metrics, and/or predicted future demand for workers 122. In one example, worker demand may be analyzed using a machine learning model which may be used to predict future worker demand for a function type, and a reservation count for workers 122 having the function type may be modified based in part on the predicted future worker demand.

The worker pool module 112 may use the worker reservation policy 118 to determine how many workers 122 to hold in the worker pool 106. In one example, the worker pool module 112 may monitor how many workers 122 are being held in the worker pool 106 and determine whether the number of workers 122 held in the worker pool 106 corresponds to a reservation count for the workers 122. In the event that the number of workers 122 falls below the reservation count, the worker pool module 112 may request that a worker factory module 114 generate a number of additional workers 122 that corresponds to a number of workers 122 needed to satisfy the reservation count and add the workers 122 to the worker pool 106. The request may indicate a program code function that is executable by the additional workers 122 (i.e., indicate function type).

The worker factory module 114 may receive a request from the worker pool module 112 and cause an additional worker 122 specified in the request to be created. For example, the worker factory module 114 may cause the worker 122 to be created by instructing an operating system to create a software container for a program code function specified in the request, and load a runtime and the program code function into the software container. A runtime may be a service that executes within the software container and the runtime provides an interface between the local operating system and a program code function instance. After creating the worker 122, the worker factory module 114 may cause the worker 122 to be paused (e.g., suspend execution of the worker 122). For example, in order to avoid unnecessary processor utilization by the worker 122, the worker factory module 114 may instruct the operating system to suspend execution of the worker 122. The newly created worker 122 may be added to the worker pool 106, making the worker 122 available to fulfill a subsequent work request to execute the program code function. For example, the worker factory module 114 may be configured to add the worker 122 to the worker pool 106 by updating the worker pool 106 (i.e., a worker pool data structure) to include a worker identifier for the worker 122.

Initializing a worker 122 and making the worker 122 available via the worker pool 106 to execute a work item may avoid execution delays associated with an amount of time needed to launch the worker 122 at the time of receiving a work request. For example, initializing a worker 122 when a work request is received may be referred to as a "cold start". A "cold start" of a worker 122 may include creating a software container and loading a runtime and a program code function into the software container at the time that a work request is received, which may result in an execution delay of the work request. "Pre-warming" a worker 122 may include initializing the worker 122 prior to receiving a work request and suspending execution of the worker 122 until a work request for the worker 122 is actually received.

A work request received from a client (not shown) may be provided to a scheduler module 108 configured to generate a work item based on the work request and schedule the work item (e.g., a job) for processing by a worker 122. In one example, a work request may result in generating multiple work items and scheduling the work items to be processed by workers 122 having various function types. For example, a work request to execute an application function may trigger the execution of multiple program code functions. As an illustration, a work request to execute an application function that stores data received from a first device may also trigger the execution of another program code function that sends a message to a second device that the data has been received from the first device.

The scheduler module 108 may be configured to determine a position of the work item in a processing queue 126 relative to other work items in the processing queue, and the scheduler module 108 may forward the work items to an evaluator module 110 when the work item reaches the front of the processing queue. For example, the scheduler module 108 may monitor computing resources used to process work items and schedule the work items for processing based in part on available computing resources. In a more specific example, the scheduler module 108 may be configured to receive a work request that includes a resource name for a program code function and any function parameters and the scheduler module 108 may create a work item (e.g., a job) that includes the resource name and the function parameters for execution by a worker 122. The work item may be scheduled for execution by a worker 124 that executes a program code function that matches the resource name.

The evaluator module 110 may be configured to receive a work item from the scheduler module 108, obtain a worker 124 from the worker pool 106 that corresponds to the work item, and assign both the work item and the worker 124 to a work item manager instance 116 for processing of the work item. A work item manager instance 116 may act as a proxy for the evaluator module 110 and may manage an execution lifecycle of a work item, which may include invoking a worker 124 to execute the work item, monitor execution of the work item, return results of the work item (if any) to a client that made the work request, and return the worker 124 to the worker pool 106. After completion of the execution lifecycle, the work item manager instance 116 may terminate. The evaluator module 110 may launch a work item manager instance 116 for each work item received by the evaluator module 110, and each work item manager instance 116 may be used to manage an execution lifecycle of a work item received by the evaluator module 110.

As a more detailed example, in response to receiving a work item from the scheduler module 108, the evaluator module 110 may request that the worker pool module 112 provide a worker 124 having a defined function type that executes a program code function that matches a program code function specified by the work item. For example, the work item may specify a resource name for a program code function and the evaluator module 110 may send the resource name to the worker pool module 112 with a request that the worker pool module 112 provide a worker 124 having a function type that executes a program code function associated with the resource name.

In response to receiving a request for a worker 124, the worker pool module 112 may query the worker pool 106 to determine whether the worker pool 106 includes a worker 124 that has a function type that corresponds to the program code function specified by work item. For example, the worker pool module 112 may query the worker pool 106 using a resource name for the program code function provided by the evaluator module 110. In the case that the worker pool 106 contains the worker 124, the worker pool module 112 may provide the worker 124 (e.g., a worker identifier or handle) to the evaluator module 110. In the case that the worker pool 106 does not contain the worker 124, the worker pool module 112 may request that the worker factory module 114 create a new worker to execute the work item. After the new worker has been initialized, the worker factory module 114 may provide the worker (e.g., a worker identifier or handle) to the worker pool module 112, and the worker pool module 112 may then provide the worker to the evaluator module 110.

Along with obtaining a worker 124, the evaluator module 110 may launch a work item manager instance 116. As described above, the work item manager instance 116 may be used to manage an execution lifecycle of the work item and the work item manager instance 116 may be terminated after the work item is completed. Launching individual instances of a work item manager to manage the lifecycles of work items, as opposed to using a single work item manager to manage the lifecycles of multiple work items, may avoid the implementation or use of synchronization techniques (e.g., mutexes) used to share resources among workers, thereby avoiding performance penalties related to synchronizing use of shared computing resources. Thus, the use of a work item manager instance 116 to manage a lifecycle of a single work item may result in performance benefits associated with additional computing resources being available to execute work items, as compared to using a single work item manager to manage lifecycles of multiple work items. However, the scope of this disclosure includes the use of a work item manager to manage multiple work items.

After obtaining a worker 124 and launching a work item manager instance 116, the evaluator module 110 may be configured to assign the worker 124 and the work item to the work item manager instance 116. As described earlier, when created, a worker 122 may be suspended. Accordingly, the work item manager instance 116 may resume the worker 124 and invoke the worker 124 to execute the work item. As part of invoking the worker 124, the work item manager instance 116 may provide function parameters (if any) to the worker 124. The work item manager instance 116 may monitor the worker 124 in order to detect a failure of the worker 124 should the worker 124 fail while executing a work item. For example, the work item manager instance 116 may monitor an execution state of the worker 124. Should the work item manager instance 116 detect an execution state indicating that the worker 124 has failed, then as described in more detail in FIG. 6, the work item manager instance 116 may request that the worker pool module 112 provide another worker 122 obtained from the worker pool 106, or create a new worker in the event that the worker pool 106 does not contain an available worker 122 to execute the work item.

During execution and/or after execution, work results produced by the worker 124 may be provided to the work item manager instance 116, and the work item manager instance 116 may return the work results to a client associated with the work request. For example, a work result may be returned to a device (e.g., an IoT (Internet of Things) device) that made a work request, a client (e.g., a user client) authorized to receive the processing results, or a service in a service provider environment (e.g., the "cloud") that made a work request.

After processing of the work item has been completed, the work item manager instance 116 may determine whether to return the worker 124 to the worker pool module 112. The worker pool module 112 may be configured to evaluate the worker pool 106 and make a determination based on a reservation count defined in the worker reservation policy 118 whether to return the worker 124 to the worker pool 106 or terminate the worker 124. A population of workers 122 in the worker pool 106 may be dynamic, in that workers 122 may be removed from the worker pool 106 in order to execute work items, and new workers may be created and added to the worker pool 106 to replace the workers 122 removed from the worker pool 106. More specifically, additional workers 122 may be added to the worker pool 106 when a worker population drops below a population threshold. As such, a worker 124 may be returned to the worker pool 106 when a reservation count for a function type is not satisfied, otherwise the worker 122 may be terminated. For example, the worker pool module 112 may evaluate the worker pool 106 to determine whether a reservation count for a function type of the worker 124 is fulfilled. In the case that the reservation count is not fulfilled, the worker 124 may be returned to the worker pool 106, thereby allowing the worker 124 to be used to execute another work item, and avoiding a performance cost (e.g., an amount of processing time) associated with creating a new worker to replace the worker 124. In the case that the reservation count is fulfilled, then the worker 124 may be terminated. The modules described in association with FIG. 1 (e.g., the worker pool module 112 or work item manager instance 116, etc.) have been described to perform specific functions associated with the processing environment 102. As will be appreciated, some functions described as being performed by a specific module may be performed by another module (e.g., the worker pool module 112, the evaluator module 110, the scheduler module 108, etc.) included in the processing environment 102.

Figure 2:
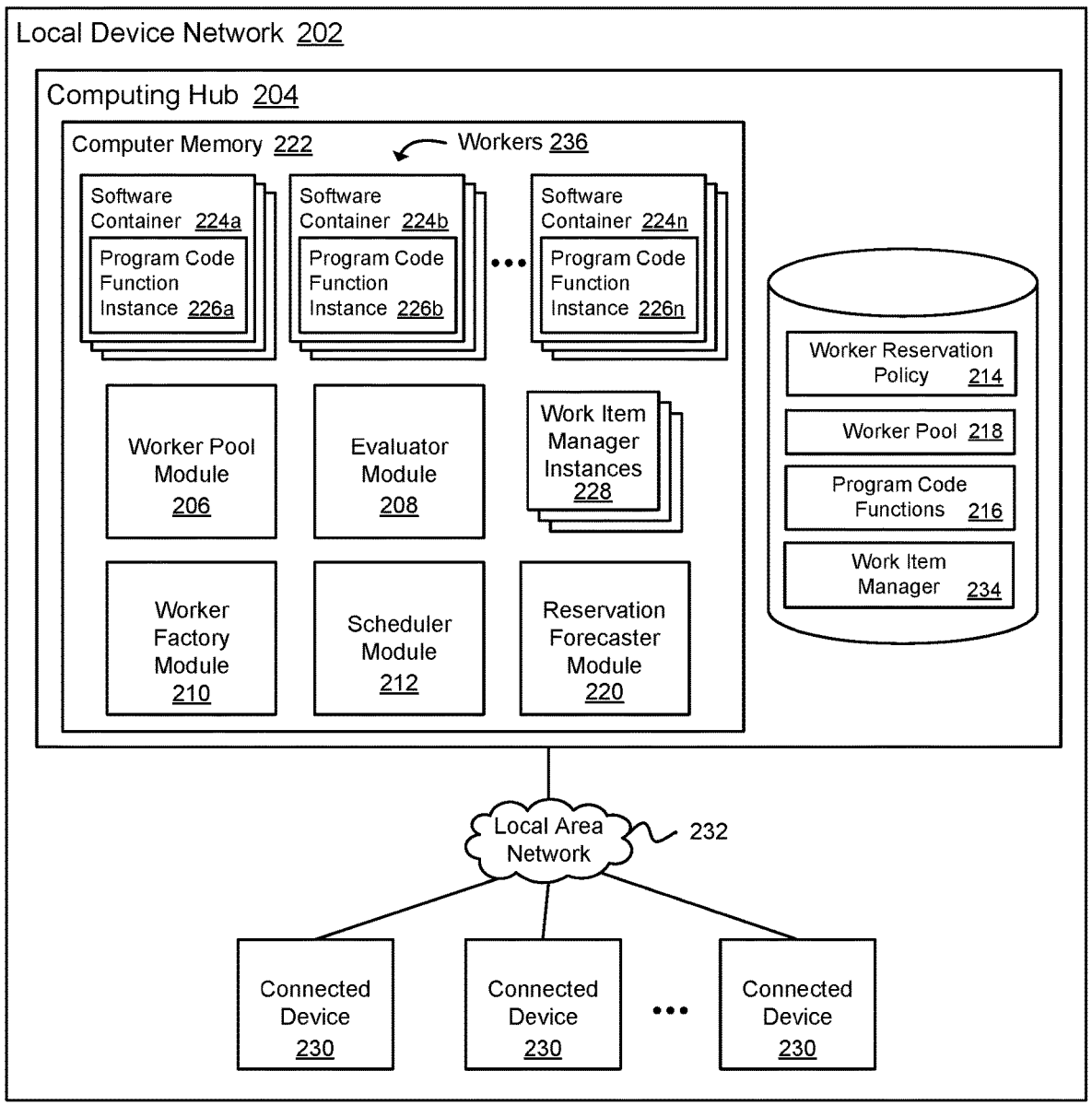
FIG. 2 is a block diagram that illustrates example components included in a system for processing work items using a processing environment implemented on a computing hub.

FIG. 2 illustrates components of an example system environment 200 on which the present technology may be executed. The system environment 200 may include a computing hub 204 located in a local device network 202. The computing hub 204 may be in communication with a plurality of connected devices 230 via a local area network (LAN) 232. A computing hub 204 may be a computing device configured to host the processing environment described above in relation to FIG. 1. In one example configuration, a service provider may provide computing hub software to users who may install the computing hub software on one or more of the users' computing devices. The computing hub software, when installed on a computing device included in the user's local device network 202, may extend service provider environment capabilities (e.g., messaging, computing, storage, etc.) to connected devices 230 configured to connect to a computing hub 204, as well provide an environment to host and execute the user's own program code functions 216. In another example, a service provider may offer a pre-configured, dedicated computing hub 204 device to users. The users may add the computing hub 204 to the user's local device network 202 in order to extend service provider environment capabilities and localized services (e.g., computing, storage, messaging, device shadowing services, machine learning, and other services.) to connected devices 230 included in the user's local device network 202, as well as provide services implemented using program code functions 216 developed by the user.

A connected device 230 may be one of many physical electronic devices that create a large network of addressable devices. The devices may be part of a "network" that is commonly referred to as the Internet of Things (IoT). The devices that make up the network may be addressable over a wireless network, such as WI-FI, Zigbee, Z-Wave, BLUETOOTH, NFC (Near Field Communication), cellular, and the like. A connected device 230 may be configured to communicate with computing resources located on a computing hub 204, as well as a device services environment described later in relation to FIG. 9.

A computing hub 204 may be configured to provide connected devices 230 with user developed services provided via program code functions 216 that, for example, may be invoked in response to work requests received from connected devices 230. The program code functions 216 may be executed using the processing environment described in FIG. 1. A program code function 216 may comprise a "serverless" function. For example, a program code function 216 may be a segment of program code that may be like a function, and the program code function 216 may receive parameters, perform processing, make service requests, and provide return values. In one example, a software container 224a-n may be used to provide an isolated environment on the computing hub 204 for a program code function instance 226a-n to execute. For example, operating system kernel functionality may be used to isolate computing resources and create separate namespaces in order to provide an isolated (containerized) user space for a program code function instance 226a-n to execute. In doing so, the program code function instance 226a-n may be contained to the isolated user space, allowing multiple containerized program code function instances 226a-n to utilize a single operating system kernel. Also, a runtime service (not shown) may be loaded into software containers 224a-n.

For example, a worker 236 comprising a software container 224a and a program code function instance 226a may be created. The program code function instance 226a may be configured to execute a program code function A. If a request is received from a connected device 230 to execute the program code function A, then parameters received from the calling connected device 230 may be passed to the worker with the program code function A, and the program code function A may be executed, and the results may be returned to the connected device 230. In the event that a program function code B was requested by the connected device 230, then a determination whether the worker pool 218 contains a worker 236 that matches the program code function B would be made because the worker 236 for program code A is not configured to execute the program code function A. Assuming the needs of the connected devices 230 and other local network hardware connected to the computing hub 204 have been effectively analyzed, there may be a worker 236 in the worker pool 218 to execute program code function B. However, in the event that there is no worker 236 in the worker pool 218 to execute the program code function B, then a new worker may be created to execute the program code function B, and the creation of the new worker may likely take much more time than loading a "warmed" worker 236 from included in the worker pool 218.

As illustrated, the computing hub 204 may include components for the processing environment described earlier, including a scheduler module 212, an evaluator module 208, a worker pool module 206, and a worker factory module 210. In one example, the modules 206/208/210/212 may be implemented as microservices using lightweight threads to provide a framework of loosely coupled services configured to communicate with one another using inter-process communications via a request-response interface. As a specific example, the modules 206/208/210/212 may be implemented using goroutines (sometimes referred to as lightweight threads), which may be functions or methods created using the Go open source programming language. The functions or methods may execute concurrently with other functions or methods.

The scheduler module 212 may be configured to create executable work items (e.g., jobs) for work requests received from connected devices 230 and to schedule the work items for processing by, for example, adding the work items to a processing queue (not shown) in a position relative to other work items contained in the processing queue. The scheduler module 212 may forward the work items to the evaluator module 208 using a request-response interface. For example, the evaluator module 208 may poll the scheduler module 212 for work items, and in response, the scheduler module 212 may retrieve work items from the processing queue and send the work items to the evaluator module 208.

The evaluator module 208 may be configured to assign a work item received from the scheduler module 212 to a work item manager instance 228 which manages execution of the work item. In response to receiving a work item, the evaluator module 208 may launch a work item manager instance 228 and use a request-response interface to obtain a worker 236 (e.g., a worker identifier) from the worker pool module 206. The request for the worker 236 may indicate a function type (a program code function 216) that corresponds to a program code function 216 specified by the work item. The worker pool module 206 may return a worker 236 (e.g., a worker identifier) to the evaluator module 208, and the evaluator module 208 may provide the work item and the worker 236 (e.g., the worker identifier) to the work item manager instance 228.

A work item manager instance 228 may act as a proxy for the evaluator module 208 to manage an execution lifecycle of a work item. The work item manager instance 228 may be an instance of a work item manager 234 configured to invoke a worker 236 to execute a work item, monitor an execution state of the work item, return work item results, if any, to a connected device 230 or another client, and return the worker 236 (e.g., a worker identifier) to the worker pool module 206. For example, as described earlier, after being launched, a worker 236 may be added to a worker pool 218 and the worker 236 may be suspended in order to avoid unnecessary processor utilization by the worker 236. Accordingly, the work item manager instance 228 may unsuspend the worker 236 and submit the work item (via inter-process communication) to the worker 236 for execution. The work item manager instance 228 may monitor execution of the work item, as described later in association with FIG. 6. After execution of the work item has completed, the work item manager instance 228 may return the worker 236 to the worker pool module 206 and the work item manager instance 228 may terminate.

The worker pool module 206 may be configured to manage a worker pool 218 of workers 236. In one example, a worker pool 218 may comprise a data record (e.g., a database record, data object, etc.) containing worker identifiers for workers 236 that may be available to execute work items. A worker 236 may be added to the worker pool 218 by adding a worker identifier for the worker 236 to the data record, and a worker 236 may be removed from the worker pool 218 by removing a worker identifier for the worker 236 from the data record. The worker pool module 206 may use a worker reservation policy 214 to manage the worker pool 218. The worker reservation policy 214 may define a reservation count for each worker 236 of a defined function type held in the worker pool 218. In one example, a reservation count for a function type may be specified by a user. In another example, the computing hub 204 may include a reservation forecaster module 220 which may be configured to determine a reservation count for a function type based on an anticipated demand for the function type. The reservation forecaster module 220 may be configured to use techniques, such as: heuristics, work request metrics, machine learning, as well as other prediction techniques. As one example, metrics for a number of work requests received during different periods may be analyzed and a reservation count for a function type may be determined based in part on the analysis. As another example, a machine learning model may be used to determine a reservation count for a function type.

The reservation counts for a function type may be determined based on information the forecaster module 220 knows about the computing hub 204, the connected devices 230, the program code functions 216 used by the connected devices 230, or the specific hardware located within a local device network 202. The connected devices 230 may be IoT devices, as described later. Because the forecaster module may collect or be provided with knowledge about the program code functions 215 used by the connected devices or other hardware connected to the computing hub 204, this overall local environment information may be used to better adapt the function types and number of workers that may be held in a worker pool 218. As a result, determining reservation counts for function types may make use of knowledge of the overall local device network 202 to better adapt the worker pool 218 to the needs of the connected devices 230, as well as other needs of the local device network 202. In addition, as described earlier, there is also an association aspect of the present technology where workers 236 are prepared to execute only one defined type of a program code function 216, and this may result in faster loading and execution of particular software containers 224a-n which have been prepared and customized in advance for the specific connected devices 230 and local device network 202. There may also be certain connected devices 230 in a localized IoT network, such as the computing hub 204 and the connected devices 230, which may have specialized computing needs and the program code functions may be provided in advance for these specialized computing needs. Edge devices (e.g., computing hubs) that are limited in resources and are more specific in their use cases based on a customer's requirements may be particularly assisted by the smarter placement of workers 236 to execute program code functions 216 due to the fact that a better mix of warmed function types may be provided in a localized device network 202. In addition, a more accurate number of warmed function types may be provided, and greater accuracy in choosing a warmed worker can be valuable where the hardware resources may be limited on computing hub 204.

The worker pool module 206 may use the worker reservation policy 214 to evaluate how many workers 236 are held in the worker pool 218 and initialize additional workers 236 when the number of workers 236 being held in the worker pool 218 falls below a reservation count. The worker pool module 206 may cause workers 236 to be initialized in computer memory 222 by sending a request to launch a worker 236, via a request-response interface, to the worker factory module 210. The request may specify a function type for the worker 236. After launching the worker 236, the worker factory module 210 may return a worker identifier to the worker pool module 206, and the worker pool module 206 may update the worker pool 218 to include the worker identifier, making the worker 236 available to execute a work item.

The worker pool module 206 may receive requests for workers 236 from the evaluator module 208, via a request-response interface, and provide the workers 236 (e.g., provide worker identifiers) to the evaluator module 208 in response to the requests. A request for a worker 236 may indicate a function type. In response to a request for a worker, the worker pool module 206 may query the worker pool 218 to determine whether the worker pool 218 contains a worker 236 having the function type. In the case that the worker pool 218 does include a worker 236, the worker pool module 206 may remove a worker identifier for the worker 236 from the worker pool 218 and return the worker identifier to the evaluator module 208. In the case that the worker pool 218 does not include a worker 236, the worker pool module 206 may send a request to the worker factory module 210 to launch a worker 236 having a function type requested by the evaluator module 208. The worker factory module 210, after launching the worker 236, may return a worker identifier for the worker 236 to the worker pool module 206, whereupon the worker pool module 206 may provide the worker identifier to the evaluator module 208.

As described above, a worker 236 used to execute a work item may be returned to the worker pool module 206 after execution of the work item has completed. More specifically, a worker identifier for the worker 236 may be returned to the worker pool module 206. The worker pool module 206 may use the worker reservation policy 214 to determine whether to return the worker 236 to the worker pool 218. For example, the worker pool module 206 may be configured to determine whether a reservation count for a number of workers 236 contained in the worker pool 218 may be fulfilled, and return the worker 236 to the worker pool 218 when the reservation count is not fulfilled. In cases where a number of workers 236 held in the worker pool 218 fulfills the reservation count, a worker 236 returned to the worker pool module 206 may be terminated. That is, a software container 224a-n and a program code function instance 226*a-n* may be removed from computer memory 222 that had been allocated for executing the software container 224*a-n*.

As indicated above, the worker factory module 210 may be configured to generate workers 236 in response to requests made by the worker pool module 206. In response to receiving a request for a worker 236, the worker factory module 210, in one example, may cause a software container 224*a-n* to be created in computer memory 222 and launch a program code function instance 226*a-n* in the software container 224*a-n*. The program code function instance 226*a-n* may have a function type specified in the request received from the worker pool module 206. That is, the worker 236 may be a containerized instance of a program code function 216 requested by the worker pool module 206. In another example, a worker 236 may be a process, service, or other type of executable object. After launching a worker 236, the worker factory module 210 may suspend the worker 236 in order to avoid unnecessary processor utilization by the worker 236, and the worker factory module 210 may return a worker identifier for the worker 236 to the worker pool module 206.

The modules described in FIG. 2 may communicate using request-response interfaces which may include, but are not limited to, inter-process communication interfaces, application programming interfaces (APIs), procedure call interfaces, and/or other types of request-response interfaces. The connected devices 230 may communicate with the computing hub 204 using any suitable protocol including, MQTT (Message Queue Telemetry Transport), CoAP (Constrained Application Protocol), HTTP (Hypertext Transfer Protocol), and HTTPS (HTTP secure).

Figure 3:
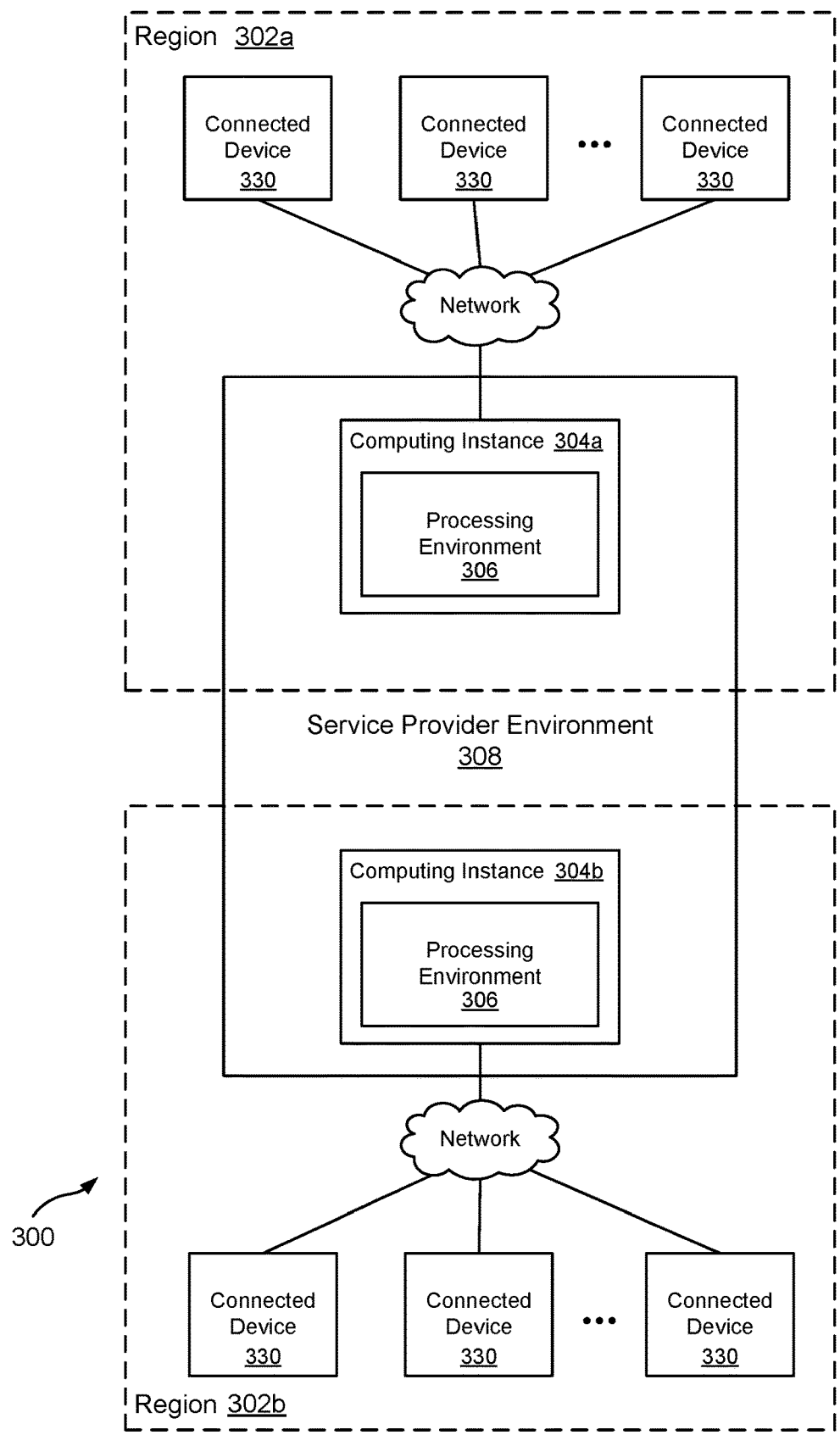
FIG. 3 is a block diagram that illustrates example components included in a system for processing work items using a processing environment implemented on a computing instance included in a service provider environment.

FIG. 3 illustrates another example system environment 300 on which the present technology may be executed. The system environment 300 may include computing instances 304*a-b* located in a service provider environment 308 (e.g., a "cloud" environment). The service provider environment 308 may include computing resources for executing computing instances 304*a-b* (e.g., virtual machines), which may be an instance of a software implementation of a machine (i.e. a computer) configured to emulate a physical machine, as described in greater detail in association with FIG. 8.

A computing instance 304*a-b* may be configured to host a processing environment 306 described previously in relation to FIG. 1. The processing environment 306 may include a scheduler module, an evaluator module, a worker pool module, a worker factory module, and other modules. The modules may be configured to perform the functionality described earlier. The computing instances 304*a-b* may be in communication with a plurality of connected devices 330 via a network. The computing instances 304*a-b* may be configured to provide the connected devices 330 with user developed services via program code functions that may be invoked in response to work requests received from connected devices 330. The program code functions may be executed using the processing environment 306.

A computing instance 304*a-b* may be located within a region 302*a-b* within a service provider environment 308. A region 302*a-b* may include a data center located within a defined geographical region that provides computing resources and services to users located within the defined geographical region. Multiple regions 302*a-b* may be distributed among a number of geographical locations in order to reduce latency associated with centralized data centers. A computing instance 304*a-b* may be configured to provide services to connected devices 330 that may include, but are not limited to, a storage service, compute service, device shadowing service, messaging service, and machine learning service.

A network used for communication between a computing instance 304*a-b* and connected devices 330 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof. While two regions 302*a-b* that include computing instances 304*a-b* are shown, it will be appreciated that the system environment 300 can include any number of regions 302*a-b* containing any number of computing instances 304*a-b*.

In another example, a function execution service hosted in a service provider environment 308 may be configured to use the processing environment 306 to manage workers that execute program code functions. The function execution service may be a "serverless" compute service that executes program code functions in response to events, and the function execution service may automatically manage underlying compute resources used to execute the program code functions. While the figures described above illustrate examples of system environments that may implement the techniques above, many other similar or different environments are possible. The example environments discussed and illustrated above are merely representative and not limiting.

Figure 4:
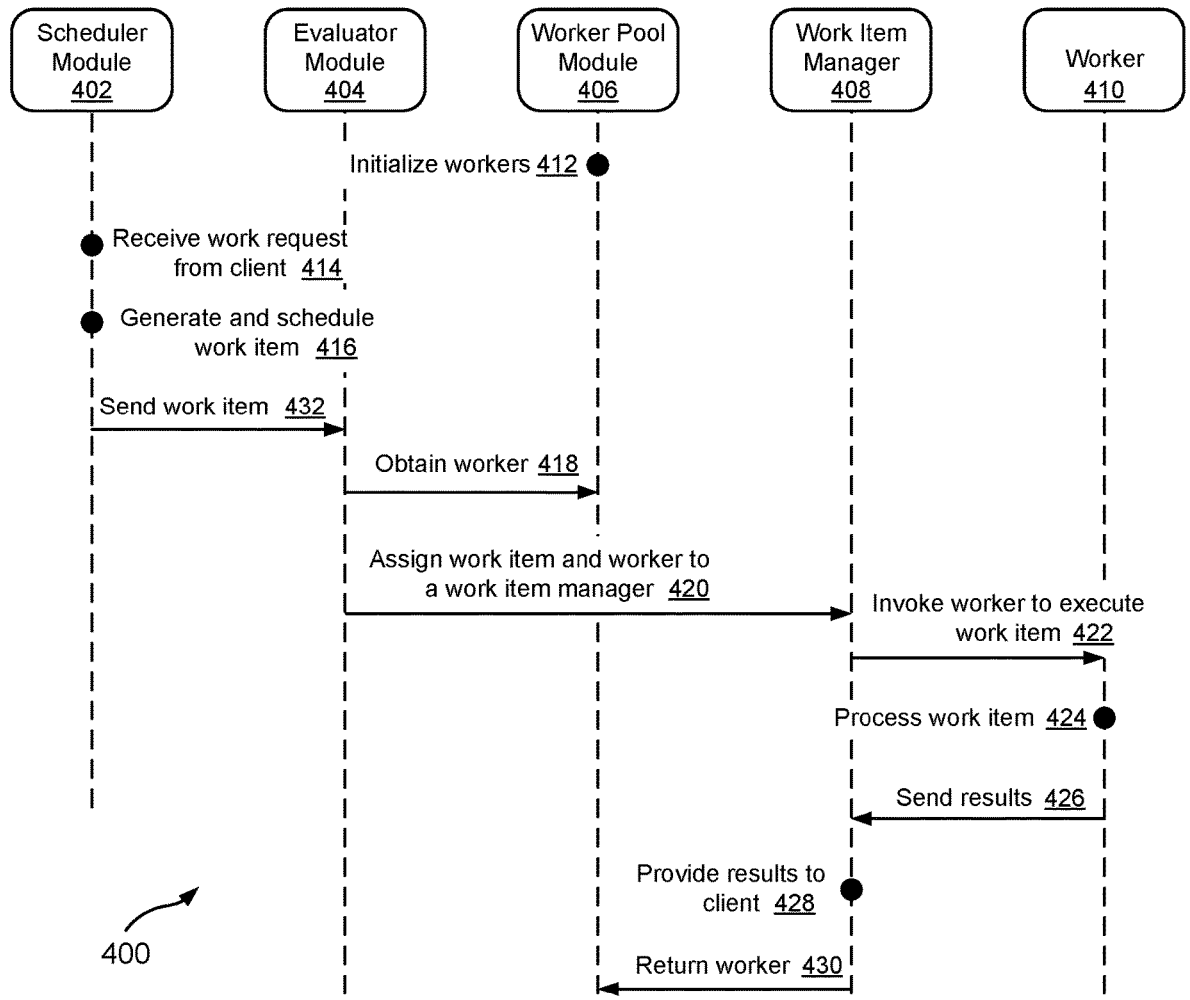
FIG. 4 is a sequence diagram illustrating an example method for executing a work item using a worker obtained from a worker pool.

Moving now to FIG. 4, a sequence diagram illustrates an example method 400 for processing a work request using a worker 410 obtained from a worker pool. Workers or worker processes, comprising containerized instances of defined program code functions, may be initialized 412 in anticipation of receiving work requests at a computing hub, computing instance, or another computing node, to execute the program code functions. For instance, the workers may be configured to execute program code functions requested by devices and the workers may be initialized and held in a worker pool so that the workers may be ready to execute the program code functions of a specific function type when work requests to execute the program code functions of the specific function type are received from the devices. The program code functions may be "serverless" functions configured to perform a task or provide a service. Accordingly, the workers may be of different function types, such that a worker having a defined function type executes a defined program code function. A number of workers to initialize may be determined using a worker reservation policy that defines a reservation count for function types. A reservation count defined in the reservation policy may specify how many workers having a function type may be held in a worker pool module 406. A reservation count may be based in part on a predicted demand for a function type, and a reservation count may be determined using a predictive technique, such as predictive modeling, or a reservation count may be defined by a user. Also, a reservation count may be periodically modified based on anticipated demand for a function type.

After initializing the workers, the workers may be paused or suspended to avoid processor utilization by the workers, and the workers may be added to the worker pool module 406, making the workers available to execute work items in response to work requests. A work request to execute a program code function may be received 414 by a scheduler module 402. The work request may have been sent by a connected device or another client or service, and the work request may include an instruction to execute a program code function, and the work request may include parameters used to execute the program code function.

In response to receiving the work request, the scheduler module 402 may be configured to generate a work item (e.g., a job) and schedule the work item 416 for processing by a worker 410 that has a function type that corresponds to the work item. More specifically, the work item may be generated to include a resource name of a program code function indicated in the work request, and the resource name may be used to identify a worker 410 in the worker pool module 406 that matches the resource name. The work item may then be scheduled to be executed by a worker 410 that comprises a containerized instance of the program code function that matches the resource name included in the work item. The scheduler module 402 may determine a position of the work item in a processing queue relative to other work items contained in the processing queue. For example, a work item may be prioritized according to various factors, such as, but not limited to, an identity or location of a client associated with a work request, a type of program code function (e.g., messaging function, storage function, data processing function, etc.) requested to be executed, the availability of a worker to execute the work item, etc. The work item may be placed in the processing queue according to a priority assigned to the work item.

The scheduler module 402 may send the work item 432 to an evaluator module 404 for processing of the work item. The evaluator module 404 may evaluate the work item and obtain 418 a worker 410 from the worker pool module 406 that has a function type that corresponds to the work item. In the case that the worker pool module 406 does not contain an available worker to execute the work item, a worker may be initialized, which may result in a delay in executing the work item due to an amount of time that may be needed to generate the worker. After obtaining a worker 410, the evaluator module 404 may assign 420 the work item and the worker 410 to a work item manager 408. In one example, the evaluator module 404 may launch an instance of the work item manager 408 for the work item sent to the evaluator module 404, and the instance of the work item manager 408 may be used to manage execution of the work item by the worker 410.

The work item manager 408 may invoke the worker 410 to execute the work item 422. For example, the work item manager 408 may cause the worker 410 to be resumed (e.g., unsuspended) and the work item manager 408 may pass the work item to the worker 410 (e.g., via an inter-process communication). The worker 424 may execute the work item 424 and send execution results 426 (if any) to the work item manager 408. The work item manager 408 may then provide the execution results to the client 428 associated with the work request. After the work item has been executed by the worker 410, the work item manager 408 may return 430 the worker 410 to the worker pool module 406, and a determination may be made whether to reuse the worker 410 to execute another work item, or discard the worker 410, as described below.

Figure 5:
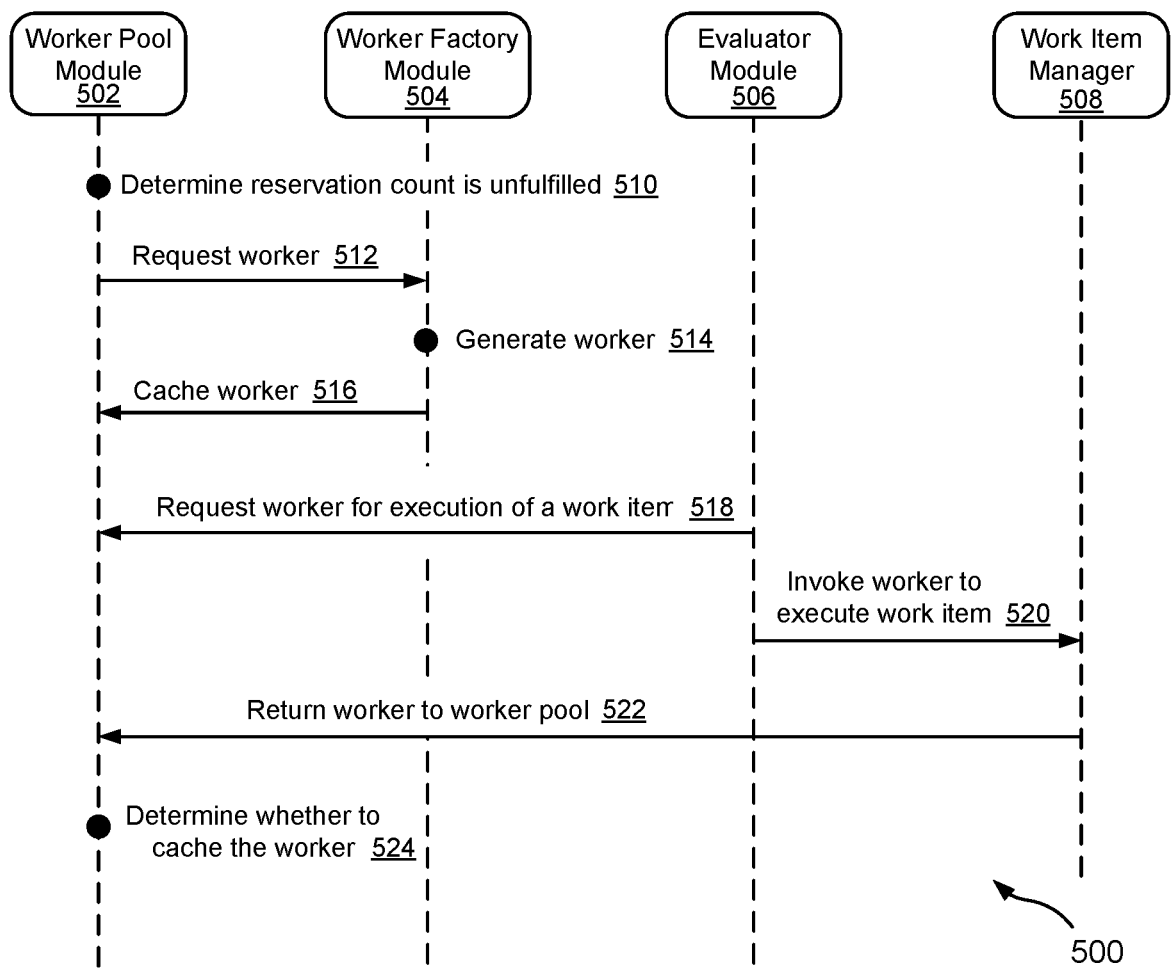
FIG. 5 is a sequence diagram that illustrates an example method for managing a worker pool using a reservation policy.

FIG. 5 is a sequence diagram that illustrates an example method 500 for managing a worker pool using a reservation policy. The worker pool may contain initialized workers which may be available to execute work items in response to work requests. A number of workers held in the worker pool may be managed using a reservation policy. The reservation policy may define a reservation count for each function type held in the worker pool, and the reservation count may be used to determine whether to add additional workers to the worker pool, as well as determine whether to reuse a worker returned to the worker pool, as explained below.

A worker pool module 502 may be used to manage the worker pool by determining whether a reservation count for a function type defined by the reservation policy is unfulfilled. For example, the worker pool module 502 may evaluate the worker pool to determine a worker count for a function type (i.e., how many workers of a function type are being held in the worker pool), and determine whether the worker count corresponds to a reservation count for the function type. In the case that the worker pool module 502 determines 510 that the reservation count is unfulfilled (i.e., that the worker count does not correspond to the reservation count), then the worker pool module 502 may send a request 512 for a worker to a worker factory module 504. In response, the worker factory module 504 may generate 514 a worker and the worker may be cached 516 in the worker pool. More specifically, worker factory module 504 may cause the worker to be initialized in computer memory, and thereafter, cause the worker to be suspended, so that the worker exists in computer memory, but the worker may not be actively utilizing a processor. As such, the worker may be ready to execute a work item when a work request is received. The worker factory module 504 may return the worker (e.g., a worker identifier) to the worker pool module 502, and the worker may be cached by adding the worker to the worker pool (e.g., adding a worker identifier to a worker pool data structure).

In response to receiving a work item, an evaluator module 506 may request 518 that the worker pool module 502 provide a worker from the worker pool to execute the work item. The worker pool module 502 may provide the worker (e.g., a worker identifier for the worker) to the evaluator module 506. The evaluator module 506 may provide the work item and the worker to a work item manager 508, and the work item manager 508 may invoke 520 the worker to execute the work item. For example, the work item manager 508 may cause the worker to be unsuspended and the work item manager 508 may pass the work item to the worker for execution of the work item.

After the work item has been executed, the work item manager 508 may return 522 the worker to the worker pool module 502. The worker pool module 502 may be configured to determine whether to cache 524 the worker so that the worker can be used to execute a future work item. The determination may be made by evaluating the worker pool to determine whether a worker count for a function type that corresponds to the worker satisfies a reservation count for the function type. In the case that the reservation count for the function type is satisfied, the worker pool may contain a sufficient number of workers to handle work items, and the worker may be discarded. In the case that the reservation count for the function type is not satisfied, the worker pool may not be full, and the worker may be returned to the worker pool, making the worker available to execute a future work item.

Figure 6:
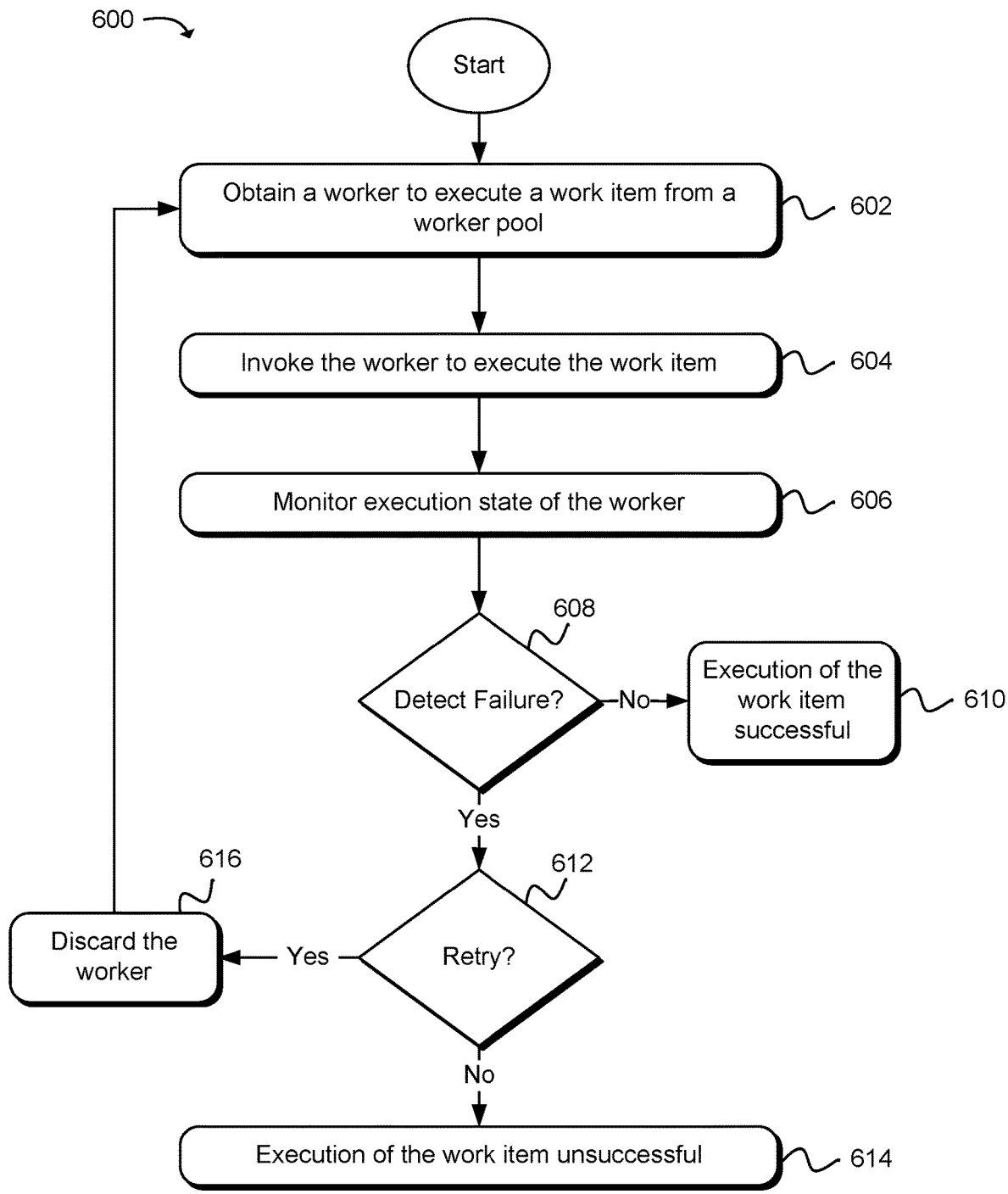
FIG. 6 is a flow diagram illustrating an example method for monitoring execution of a work item.

FIG. 6 is a flow diagram illustrating an example method 600 for monitoring an execution state of a work item to detect a failure of a worker. As in block 602, a worker may be obtained from a worker pool to execute a work item. The worker may be obtained in response to receiving a work request from a client to execute a program code function, which the worker may be configured to execute. After obtaining the worker from the work pool, the worker may be invoked to execute the work item, as in block 604.

As in block 606, an execution state of the worker may be monitored to determine whether or not the work item is executed successfully. If no failure of the worker is detected, then as in block 610, execution of the work item was successful. However, in the case that a failure of the worker is detected (e.g., an execution state indicates that the worker has stopped functioning), then as in block 608, a determination may be made whether to retry execution of the work item, as in block 612. Whether to retry execution of the work item may be dependent upon a number of retries that have already been attempted. For example, a number of attempts to retry execution of a work item may be limited to a maximum retry attempts. In the case that the maximum number of retry attempts has not been exceeded, then as in block 616, the failed worker may be discarded and a new worker may be obtained from the worker pool (or a new worker may be created when the worker pool does not contain a worker), and the new worker may be invoked to execute the worker item. However, in the case that a maximum number of retry attempts have been performed, then as in block 614, execution of the work item has been unsuccessful, and a client associated with the work request may be notified.

Figure 7:
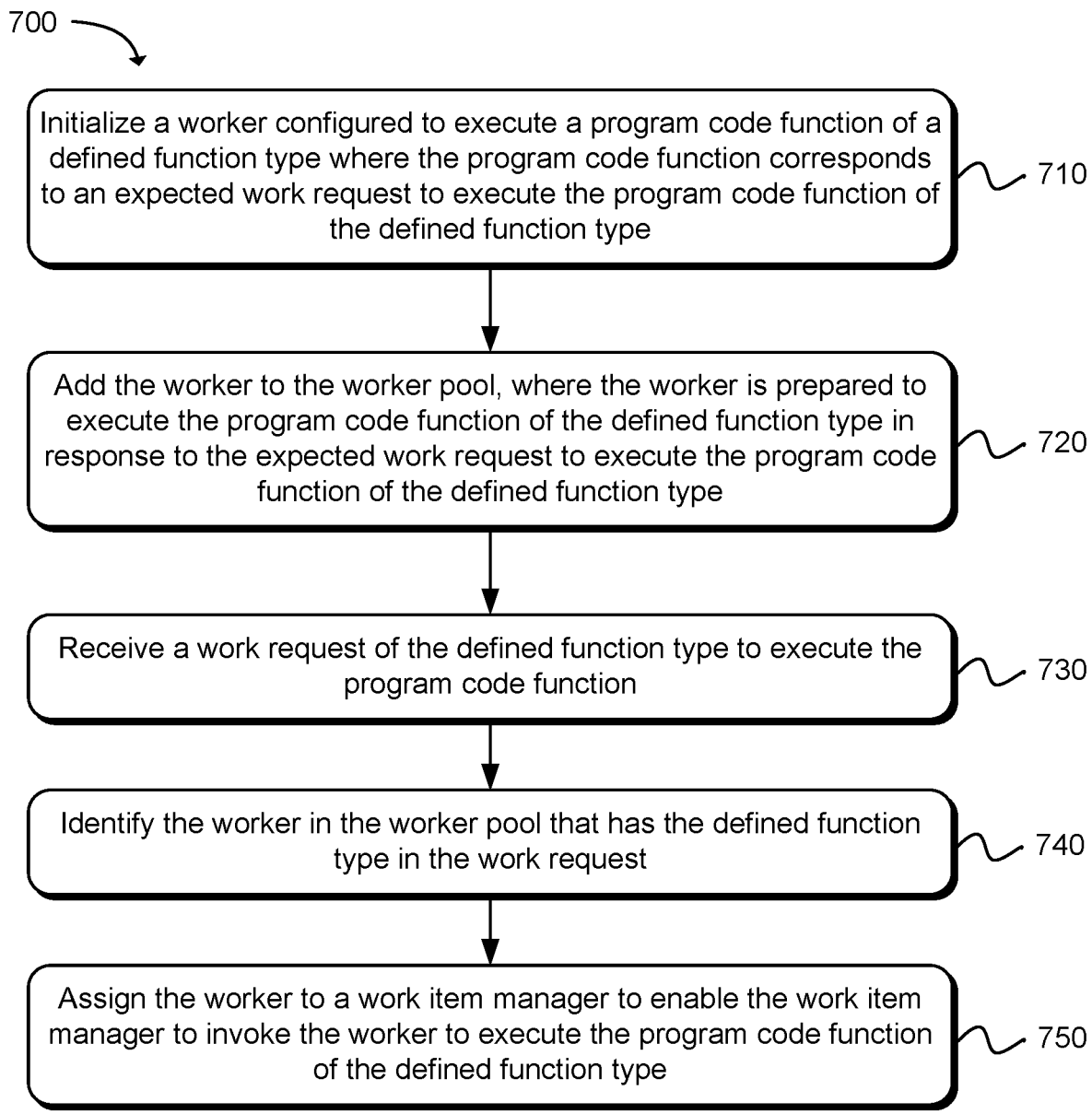
FIG. 7 is a flow diagram that illustrates an example method for evaluating a work request to execute a program code function.

FIG. 7 is a flow diagram that illustrates an example method 700 for evaluating a work request to execute a program code function. In one example, the work request may be received at a computing hub included in a local device network that includes connected devices that connect to the computing hub and send work requests. In another example, the work request may be received at a computing instance included in a service provider environment that receives work requests from clients.

Starting in block 710, a worker configured to execute an instance of a program code function may be initialized in computer memory, where the program code function may correspond to an expected work request to execute the program code function of the defined function type. The worker may be configured to execute a program code function of a defined function type (e.g., program code function A) in anticipation of receiving a work request to execute the program code function of the defined function type (e.g., program code function A). The worker may be initialized according to a worker reservation policy that sets a number of workers to hold in a worker pool based in part on anticipated requests to execute the program code function of the defined function type. For example, an expectation may exist, a policy may be provided, or a rule may determine that at least 5 requests for a program code function A may be received over a defined amount of time, and 10 requests for a program function B may be received over a defined amount of time, and thus, a corresponding number of workers for the defined function types (program code function A and program code function B) may be initialized prior to the requests for the functions types are received from the clients.

The worker, as in block 720, may be added to a worker pool, where the worker may be prepared to execute the program code function of the defined function type in response to the expected work request to execute the program code function of the defined function type. The worker pool may be defined by the worker reservation policy, wherein the worker may be made available to execute the program code function of the defined function type in response to a work request of the defined function type. As noted above, the worker reservation policy may determine a number of workers that are held in the worker pool based in part on an anticipated demand for the workers. For example, the worker reservation policy may define a reservation count for each function type in the worker pool, where a function type may be a containerized instance of a defined program code function, and the reservation count may determine how many workers of a function type may be contained in the worker pool. In one example, a reservation count for a function type may be modified based in part on an anticipated demand for workers of a function type. For example, work request demand for program code functions may be analyzed using a machine learning model to predict future work request demand for the program code functions, and the reservation counts for the function types may be modified based in part on the predicted future work request demand for the program code functions.

In one example, a worker may be initialized and added to the worker pool in response to a determination that a reservation count for a function type is unfulfilled in the worker pool. For example, the worker of the function type may be generated by initializing an instance of a program code function that corresponds to the function type, and adding the worker to the worker pool. In one example, a software container may be created and the instance of the program code function may be loaded into the software container.

As in block 730, a work request of the defined function type to execute the program code function may be received. In one example, a work item may be scheduled for execution by a worker. For example, scheduling the work item may include generating the work item to include a resource name of a program code function and using the resource name to identify a worker in the worker pool that matches the resource name. Also, scheduling the work item may include determining a position of the work item relative to other work items in a processing queue.

As in block 740, a worker that matches the defined function type in the work request may be identified in the worker pool. The worker may be configured to execute a work item. That is, the worker may execute the program code function specified in the work request. As in block 750, the work item and the worker may be assigned to a work item manager to enable the work item manager to invoke the worker to execute the work item. In one example, assigning the work item and the worker to the work item manager may include invoking an instance of the work item manager, and passing the work item and a worker handle for the worker to the instance of the work item manager. The instance of the work item manager may then invoke the worker to execute the work item.

The instance of the work item manager may monitor the worker, and in the case that the instance of work item manager detects a failure of the worker, the instance of the work item manager may request a new worker from the worker pool and provide the work item to the new worker for execution. After completion of the work item, the instance of the work item manager may return the worker to the worker pool. Thereafter, the instance of the work item manager may be terminated. Returning the worker to the worker pool may include determining that a reservation count for workers of the function type is unfulfilled, whereupon the worker is retained in the worker pool. Alternatively, a determination may be made that a reservation count for workers of the function type is fulfilled, whereupon the worker may be discarded.

Figure 8:
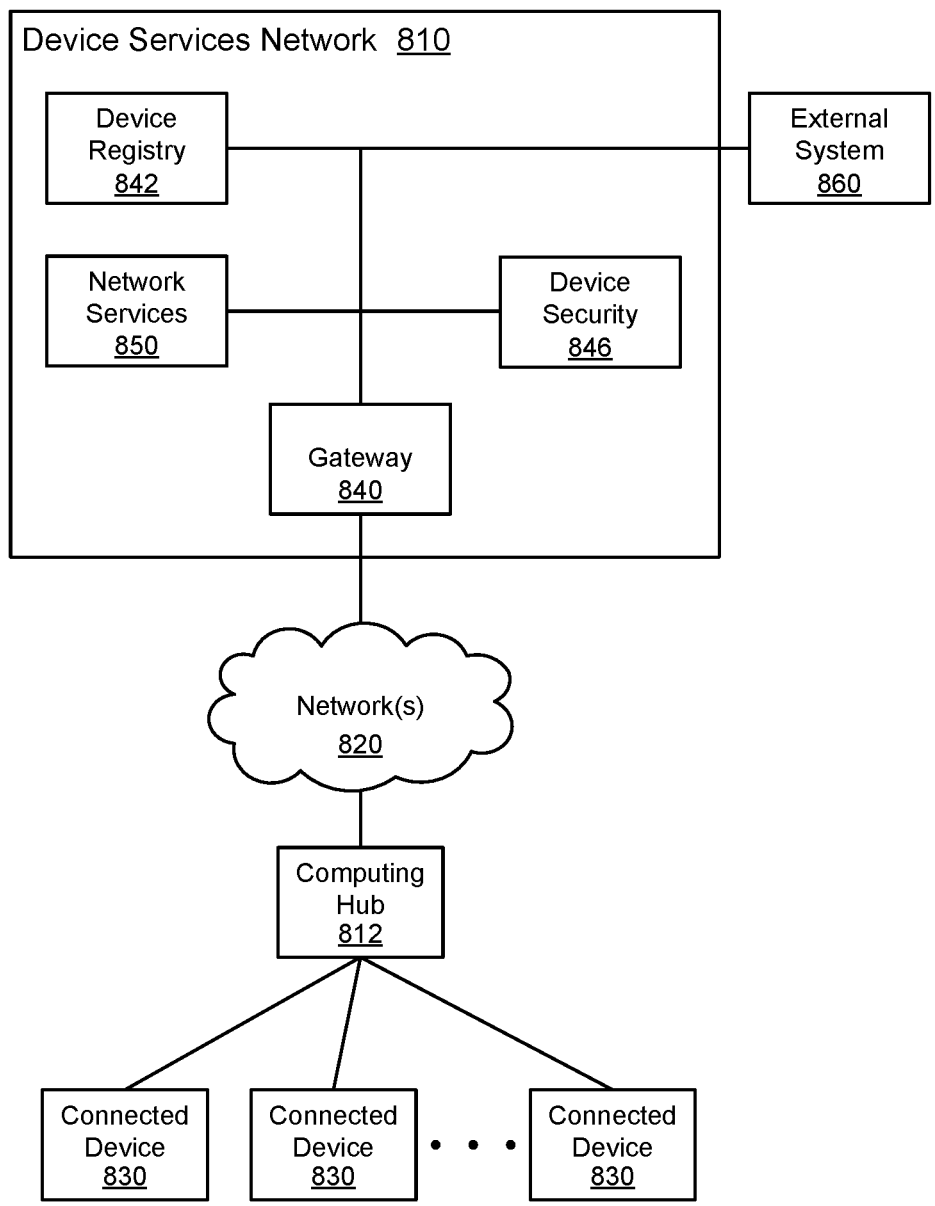
FIG. 8 is a block diagram illustrating an example computer networking architecture for a device services environment.

FIG. 8 is a block diagram illustrating an example device services environment 810 with which connected devices 830 and/or a computing hub 812 described earlier may communicate. The device services environment 810, which may be referred to as a device communication environment or system that comprises various resources made accessible via a gateway server 840 to computing hubs 812 and connected devices 830 that access the gateway server 840 via a network 820, such as a local wireless network that provides access to a wide area network. The connected devices 830 may access the device services environment 810 through the computing hubs 812 in order to access network and device services, such as data storage and computing processing features. Services operating in the device services environment 810 may communicate data and publication messages to the connected devices 830, via the computing hubs 812, in response to requests from the connected devices 830 and/or in response to computing operations within the services.

The device services environment 810 may comprise communicatively coupled component systems 840, 842, 846, and 850 that operate to provide services to the connected devices 830. The gateway server 840 may be configured to provide an interface between the connected devices 830 and the device services environment 810. The gateway server 840 receives requests from the connected devices 830 and forwards corresponding data and publication messages to the appropriate systems within the device services environment 810. Likewise, when systems within the device services environment 810 attempt to communicate data instructions to the connected devices 830, the gateway server 840 routes those requests to the correct connected device 830.

The gateway server 840 may be adapted to communicate with varied connected devices 830 using various different computing and communication capabilities. For example, the gateway server 840 may be adapted to communicate using either TCP (Transmission Control Protocol) or UDP (User Datagram Protocol) protocols. Likewise, the gateway server 840 may be programmed to receive and communicate with the connected devices 830 using any suitable protocol including, for example, MQTT (Message Queue Telemetry Transport), CoAP (Constrained Application Protocol), HTTP (Hypertext Transfer Protocol), and HTTPS (HTTP secure). The gateway server 840 may be programmed to convert the data and instructions or publication messages received from the connected devices 830 into a format that may be used by other server systems comprised in the device services environment 810. In one example, the gateway server 840 may be adapted to convert a publication message received using the HTTPS protocol into a JSON (JavaScript Object Notation) formatted publication message that is suitable for communication to other servers within the device services environment 810.

The gateway server 840 may store, or may control the storing, of information regarding the connected devices 830 that have formed a connection to the particular gateway server 840 and for which the particular gateway server 840 may be generally relied upon for communications with the connected device 830. In one example, the gateway server 840 may have stored thereon information specifying the particular connected device 830 such as a device identifier. For each connection established from the particular connected device 830, the gateway server 840 may also maintain information identifying the connection. For example, a connection identifier may be generated and stored for each connection established with a particular connected device 830. Information relating to the particular connection may also be stored. For example, information identifying the particular socket of the gateway server 840 on which the connection was established, as well as information identifying the particular protocol used by the connected device 830 on the connection may be stored by the gateway server 840. Information such as the socket and protocol may be used in order to facilitate further communications via the particular connection.

In one example, the gateway server 840 may communicate via any suitable networking technology with a device registry server 842. The device registry server 842 may be adapted to track the attributes and capabilities of each connected device 830. In an example, the device registry sever 842 may be provisioned with information specifying the attributes of the connected devices 830. The device registry server 842 may comprise data specifying rules or logic (e.g., automation rules) for handling various requests that may be received from the connected devices 830. The device registry server 842 may be programmed to convert specialized device functions or commands received in particular communication protocols such as, for example HTTPS, MQTT, CoAP, into functions or commands using particular protocols that are understood by other of the servers in the device services environment 810. In one example, the device registry server 842 may be provisioned with information specifying that upon receipt of a particular request from a particular connected device 830, a request should be made to store the payload data of the request in a particular network service server 850. The device registry server 842 may be similarly programmed to receive requests from servers 842, 850 and convert those requests into commands and protocols understood by the connected devices 830.

The device security server 846 maintains security-related information for the connected devices 830 that connect to the device services environment 810. In one example, the device security server 846 may be programmed to process requests to register connected devices 830 with the device services environment 810. For example, entities such as device manufacturers, may forward requests to register connected devices 830 with the device services environment 810. The device security server 846 receives registration requests and assigns unique device identifiers to connected devices 830 which use the device identifiers on subsequent requests to access the device services environment 810. The device security server 846 stores, for each registered device, authentication information that may be provided during the device registration process. For example, a request to register a connected device 830 may comprise information identifying the connected device 830 such as a device serial number and information for use in authenticating the connected device 830. In one example, the information may comprise a digital certificate and may comprise a public key of a public key-private key pair. The information may be stored in relation to the assigned device identifier for the particular connected device 830. When the connected device 830 subsequently attempts to access the device services environment 810, the request may be routed to the device security server 846 for evaluation. The device security server 846 determines whether authentication information provided in the request is consistent with the authentication information stored in relation to the device identifier and provided during the registration process.

The device security server 846 may be further programmed to process request to associate particular entities (individuals or organizations) with particular connected devices 830. The device security server 846 may be adapted to receive requests to register entities, which may be, for example, individuals, users, accounts, and/or organizations, as authorized to control or communicate with a particular connected device 830. In one example, a request may be received from an individual or organization that may have purchased a connected device 830 from a manufacturer. For example, the device may be a dishwasher, thermostat, or lighting assembly that an individual or organization purchased from the manufacturer. The individual or organization may initiate a request to register the connected device 830 with the individual or an organization with which the organization is associated. The request may be routed to a web services server which may be comprised in device services environment 810 or which communicates the request to the device services environment 810. The request identifies the connected device 830 and the particular entity (individual or organization) that is requesting to be associated with the connected device 830. In one example, the request may comprise a unique device identifier that was assigned when the connected device 830 was registered with the system. The request further may comprise information uniquely identifying the entity that is registering as having authority to communicate with and/or control the particular connected device 830.

The device security server 846 stores the information identifying the particular entity in relation with the device identifier. When the particular entity subsequently attempts to control or communicate data to the particular connected device 830, the device security server 846 may use the information to confirm that the particular entity is authorized to communicate with or control the particular connected device 830. When an entity that has not been registered as being authorized to communicate with the connected device 830 attempts to communicate with or control the connected device 830, the device security server 846 may use the information stored in the device security server 846 to deny the request.

A network services server 850 may be any resource or processing server that may be used by any of servers 840, 842, or 846 in processing requests from the connected devices 830. In one example, network services server 850 may provide data storage and retrieval services and/or on-demand processing capacity. In an example scenario, the network services server 850 may be any of numerous network accessible services including, for example, web or cloud-based services. In one example, the web services server 850 may be programmed to provide particular processing for particular connected devices 830 and/or groups of connected devices 830.

Servers 840, 842, 846, and 850 may be communicatively coupled via any suitable networking hardware and software. For example, the servers may communicate via a local area network or wide area network.

An external system 860 may access device services environment 810 for any number of purposes. In one example, an external system 860 may be a system adapted to forward requests to register connected devices 830 with the device services environment 810. For example, an external system 860 may include a server operated by or for a device manufacturer that sends requests to device services environment 810, and device security server 846 in particular, to register connected devices 830 for operation with device services environment 810. Similarly, the external system 860 may be a system operated to provide a gateway for entities (individuals or organizations) to register an ownership or control relationship with a particular connected device 830.

The connected devices 830 may be any device that may be communicatively coupled via a computing hub 812 or a network 820, with the device services environment 810. For example, the connected devices 830 may be computing devices such as smart phones and tablet computers, automobiles, appliances such as washers and driers, industrial sensors, switches, control systems, etc. In one example, each of the connected devices 830 may communicate over the network 820 to store data reflecting the operations of the particular connected device 830 and/or to request processing provided by, for example, network services server 850. While FIG. 8 depicts three connected devices 830, it will be appreciated that any number of connected devices 830 may access the device services environment 810 via the gateway server 840. Further it will be appreciated that the connected devices 830 may employ various different communication protocols. For example, some connected devices 830 may transport data using TCP, while others may communicate data using UDP. Some connected devices 830 may use MQTT, while others may use CoAP, and still others may use HTTPs. It will also be appreciated that each of connected devices 830 may be programmed to send and receive particular functions or commands in its requests that are not compatible with other devices or even the systems within device services environment 810. The gateway server 840 may be programmed to receive and, if needed, attend to converting such requests for processing with the device services environment 810.

Figure 9:
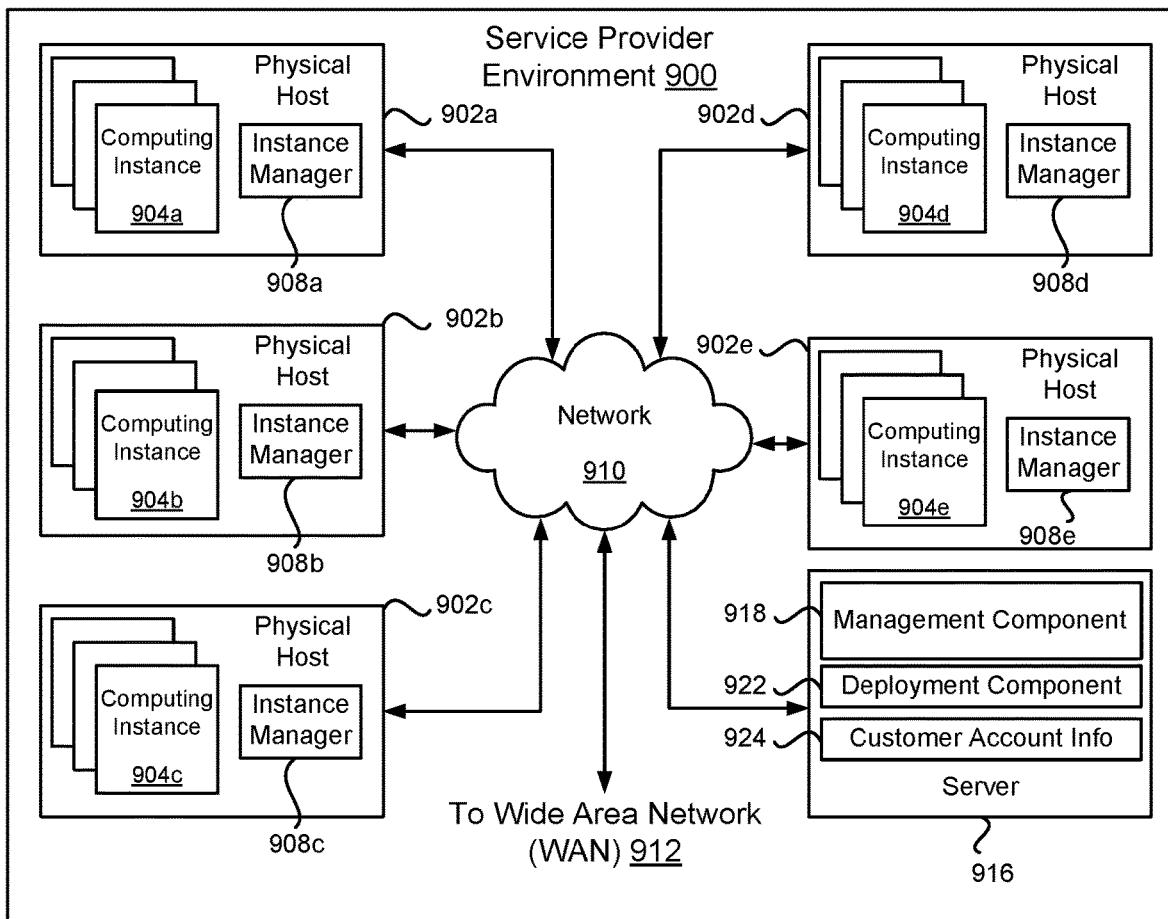
FIG. 9 is a block diagram that illustrates an example service provider environment.

FIG. 9 is a block diagram illustrating an example service provider environment 900 referenced earlier. In one example, the service provider environment 900 may include one or more computing instances 904*a-e* implemented on a physical host 902*a-e*. Also, in one example, the service provider environment 900 may be used to implement the device services environment described above. The service provider environment 900 may include computing resources that may include physical hosts 902*a-e*, computing instances 904*a-e*, virtualized services, and other types of computing resources which may be available for purchase and use by customers of a computing service provider. The computing resources may have many different configurations of processor capabilities, main memory, disk storage, and operating system. In particular, the service provider environment 900 depicted illustrates one environment in which the technology described herein may be used.

The service provider environment 900 may be one type of environment that includes various virtualized service resources that may be used, for instance, to host computing instances 904*a-e*. For example, the service provider environment 900 may offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or network services on a permanent or as-needed basis. The computing resources can also include, but are not limited to, computing instances 904*a-e* and images, security groups, option groups, gateways, option sets, network access control lists ("ACLs"), subnets, storage buckets, network interfaces, snapshots, spot market requests, and storage volumes.

The computing resources described above may be provided in one particular implementation by one or more data centers operated by a service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks 912 ("WANs"), such as the Internet.

The service provider environment 900 may be capable of delivery of computing, storage and networking capacity as a software service to a community of end recipients. In one example, the service provider environment 900 may be established for an organization by or on behalf of the organization. That is, the service provider environment 900 may offer a "private cloud environment." In another example, the service provider environment 900 may support a multi-tenant environment, wherein a plurality of customers may operate independently (i.e., a public cloud environment). Generally speaking, the service provider environment 900 may provide the following models: Infrastructure as a Service ("IaaS"), Platform as a Service ("PaaS"), and/or Software as a Service ("SaaS"). Other models may be provided. For the IaaS model, the service provider environment 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the service provider environment 900. End customers may access the service provider environment 900 using networked client devices, such as desktop computers, laptops, tablets, smartphones, etc. running web browsers or other lightweight client applications, for example. Those familiar with the art will recognize that the service provider environment 900 may be described as a "cloud" environment.

The particularly illustrated service provider environment 900 may include a plurality of servers 902*a-e*. While four servers are shown, any number may be used, and large data centers may include thousands of servers. The service provider environment 900 may provide computing resources for executing computing instances 904*a-e*. Computing instances 904*a-e* may, for example, be virtual machines. A virtual machine may be an instance of a software implementation of a machine (i.e. a computer) that executes applications like a physical machine. In the example of a virtual machine, each of the servers 902*a-e* may be configured to execute an instance manager 908*a-e* capable of executing the instances. The instance manager 908*a-e* may be a hypervisor, virtual machine monitor (VMM), or another type of program configured to enable the execution of multiple computing instances 904*a-e* on a single server. Additionally, each of the computing instances 904*a-e* may be configured to execute one or more applications.

One or more servers 916 may be reserved to execute software components for managing the operation of the service provider environment 900 and the computing instances 904*a-e*. For example, a server 916 may execute a management component 918. A customer may access the management component 918 to configure various aspects of the operation of the computing instances 904*a-e* purchased by a customer. For example, the customer may setup computing instances 904*a-e* and make changes to the configuration of the computing instances 904*a-e*.

A deployment component 922 may be used to assist customers in the deployment of computing instances 904*a-e*. The deployment component 922 may have access to account information associated with the computing instances 904*a-e*, such as the name of an owner of the account, credit card information, country of the owner, etc. The deployment component 922 may receive a configuration from a customer that includes data describing how computing instances 904*a-e* may be configured. For example, the configuration may include an operating system, provide one or more applications to be installed in computing instances 904*a-e*, provide scripts and/or other types of code to be executed for configuring computing instances 904*a-e*, provide cache logic specifying how an application cache should be prepared, and other types of information. The deployment component 922 may utilize the customer-provided configuration and cache logic to configure, prime, and launch computing instances 904*a-e*. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the service provider environment 900 and the servers 902*a-e*, 916. The network 910 may be a local area network (LAN) and may be connected to a Wide Area Network (WAN) 912 or the Internet, so that end customers may access the service provider environment 900. The network topology illustrated in FIG. 9 has been simplified, many more networks and networking devices may be utilized to interconnect the various computing systems disclosed herein.

Figure 10:
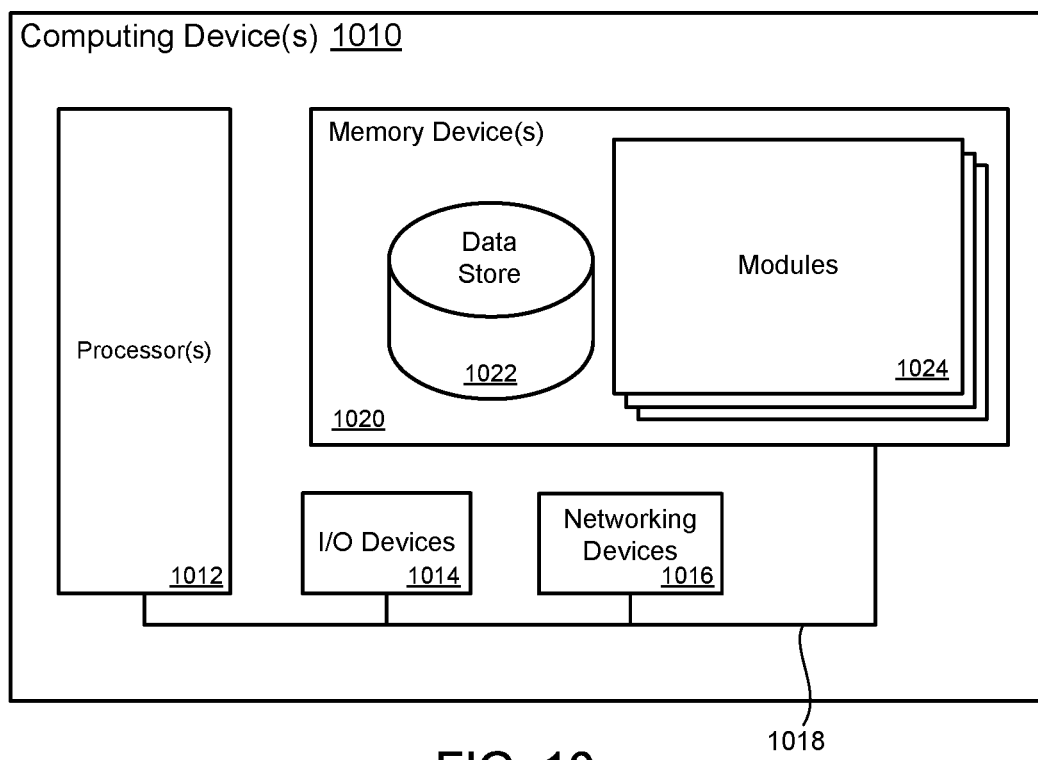
FIG. 10 is block diagram illustrating an example of a computing device that may be used to execute a method for evaluating a work request to execute a program code function using a processing environment.

FIG. 10 illustrates a computing device 1010 on which service modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. In one aspect, the memory device 1020 may include a scheduler module, an evaluator module, a worker pool module, a worker factory module, as well as other modules. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high-level programming languages that are compiled, interpreted or executed using a hybrid of the methods.

The computing device may also have access to I/O (input/output) devices 1014 that are usable by the computing devices. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computing hub, comprising:
   at least one processor;
   at least one memory device including instructions that, when executed by the at least one processor, cause the computing hub to:
   initialize a worker having a function type that is configured to execute a program code function requested by a device, wherein the worker is initialized in anticipation of receiving a work request from the device to execute the program code function, and the worker is initialized according to a worker reservation policy which specifies a number of workers to hold in a worker pool based in part on a number of anticipated work requests to be received from devices to execute the program code function;
   add the worker to the worker pool that contains a plurality of workers having function types configured to execute program code functions requested by devices, and the plurality of workers are available to process work requests received from the devices to execute the program code functions;
   receive a work request from the device to execute the program code function on the computing hub, wherein the computing hub is included in a local device network which includes the devices that connect to the computing hub, and the work request specifies the program code function and work request parameters;
   identify the worker in the worker pool that matches the function type configured to execute the program code function; and
   assign a work item and the worker to a work item manager to enable the work item manager to invoke the worker to execute the program code function.

2. The computing hub as in claim 1, wherein the memory device includes instructions that, when executed by the at least one processor, cause the computing hub to:
   return processing results produced by the worker to one or more of: a device that made the work request, a client authorized to receive the processing results, or a service in a service provider environment;
   determine whether to return the worker to the worker pool; and
   terminate an instance of the work item manager.

3. The computing hub as in claim 2, wherein a determination whether to return the worker to the worker pool further comprises:
   determine whether a reservation count for a number of workers contained in the worker pool is fulfilled, wherein the worker reservation policy defines the reservation count for a number of workers to be contained in the worker pool; and
   return the worker to the worker pool when the reservation count is not fulfilled.

4. The computing hub as in claim 1, wherein the work item manager monitors an execution state of the worker.

5. A computer implemented method, comprising:
   initializing a worker configured to execute a program code function of a defined function type, wherein the worker is initialized to execute the program code function of the defined function type in response to an expected work request received from a connected device configured to request the program code function of the defined function type;
   adding the worker to a worker pool, wherein the worker is prepared to execute the program code function of the defined function type in response to the expected work request to execute the program code function of the defined function type;
   receiving a work request to execute the program code function of the defined function type;
   identifying the worker in the worker pool that has the defined function type identified in the work request; and
   assigning the worker to a work item manager to enable the work item manager to invoke the worker to execute the program code function of the defined function type.

6. The method as in claim 5, further comprising:
   receiving the program code function at a function host that receives work requests from connected devices to execute the program code function of the defined function type; and
   identifying the defined function type from the program code function received to allow the worker for the program code function of the defined function type to be initialized and added the worker pool, and to allow the work request for the program code function of the defined function type to be matched to the worker.

7. The method as in claim 5, wherein the program code function corresponds to the expected work request and a correspondence is defined by matching at least one of: a defined function type, a code function name, program code function input and output, an execution hardware type, a requesting device type a software container types, execution libraries, or interface libraries.

8. The method as in claim 5, wherein a worker reservation policy defines a reservation count for workers of each function type based in part on expected work requests to be received from connected devices included in a local device network, and wherein the reservation count determines how many of the workers of the function type are contained in the worker pool.

9. The method as in claim 8, further comprising:
   determining that a reservation count for workers of a function type is unfulfilled in the worker pool;
   generating a worker having the function type by initializing an instance of a program code function that corresponds to the function type; and
   adding the worker to the worker pool.

10. The method as in claim 8, further comprising:
    receiving a worker having a function type as returned by the work item manager upon completion of execution of the program code function;
    determining that a reservation count for workers of the function type is unfulfilled; and
    returning the worker to the worker pool.

11. The method as in claim 8, further comprising:
    receiving a worker having a function type returned by the work item manager;
    determining that a reservation count for workers of the function type is fulfilled; and
    discarding the worker.

12. The method as in claim 8, further comprising modifying a reservation count for a function type based in part on anticipated demand for workers of the function type as defined at least in part on expected work requests for connected devices included in a local device network.

13. The method as in claim 8, further comprising:
analyzing work request demand for program code functions using a machine learning model to predict future work request demand for the program code functions; and
modifying reservation counts for function types based in part on the predicted future work request demand for the program code functions.

14. The method as in claim 5, wherein receiving the work request further comprises receiving the work request at a computing hub included in a local device network, and the work request is received from a service included in a service provider environment.

15. The method as in claim 5, wherein scheduling the work item further comprises generating the work item based on the work request, and the work item includes a resource name of the program code function and using the resource name to identify the worker in the worker pool that matches the resource name.

16. The method as in claim 5, wherein assigning the work item and the worker to the work item manager further comprises:
invoking the work item manager;
passing the work item and a worker handle for the worker to the work item manager, wherein the work item manager, comprises:
invoking the worker to execute the work item,
sending processing results returned by the worker to a recipient,
returning the worker to the worker pool; and
terminating the work item manager.

17. The method as in claim 16, wherein the work item manager further:
detects a failure of the worker via monitoring of an execution state of the worker;
requests a new worker from the worker pool; and
provides the work item to the new worker to be executed.

18. A non-transitory machine readable storage medium including instructions embodied thereon, the instructions when executed by one or more processors:
initialize a plurality of workers having function types configured to execute defined program code functions in anticipation of receiving work requests to execute the program code functions, wherein a worker reservation policy determines a number of workers of function types to be held in a worker pool based in part on anticipated demand to execute the defined program code functions;
add the plurality of workers to a worker pool, making the workers available to execute work items in response to receiving the work requests to execute the defined program code functions;
receive a work request to execute a program code function;
schedule a work item to be processed by a worker having a function type that matches the program code function specified by the work request;
identify the worker in the worker pool that has the function type; and
assign the work item and the worker to an instance of a work item manager to enable the work item manager to provide the work item to the worker, and to enable the work item manager to monitor an execution state of the worker.

19. The non-transitory machine readable storage medium in claim 18, further comprising instructions that when executed by the one or more processors cause the one or more processors to:
determine that a reservation count for a number of workers contained in the worker pool is not fulfilled, wherein the worker reservation policy defines the reservation count;
generate a new worker by initializing an instance of a program code function in a software container; and
adding the new worker to the worker pool.

20. The non-transitory machine readable storage medium in claim 18, further comprising instructions that when executed by the one or more processors cause the one or more processors to:
receive the worker returned by the work item manager;
evaluate a number of workers contained in the worker pool based in part on a reservation count defined by the worker reservation policy; and
return the worker to the worker pool to fulfill the reservation count.

* * * * *